United States Patent
Levin et al.

(10) Patent No.: US 7,805,307 B2
(45) Date of Patent: Sep. 28, 2010

(54) TEXT TO SPEECH CONVERSION SYSTEM

(75) Inventors: Burton L. Levin, Lake Oswego, OR (US); Charles E. Pierson, Battle Ground, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1913 days.

(21) Appl. No.: 10/676,273

(22) Filed: Sep. 30, 2003

(65) Prior Publication Data

US 2005/0071167 A1     Mar. 31, 2005

(51) Int. Cl.
*G10L 13/08* (2006.01)
*G10L 11/00* (2006.01)
*G06K 9/00* (2006.01)

(52) U.S. Cl. .............. 704/260; 704/270; 382/114; 382/181

(58) Field of Classification Search ............... 704/251, 704/260, 270, 231, 258, 271, 272; 382/310, 382/187, 189, 309, 159, 228, 227, 181, 153; 434/112
See application file for complete search history.

(56) References Cited

U.S. PATENT DOCUMENTS

| | | |
|---|---|---|
| 3,632,887 A | 1/1972 | Leipp et al. |
| 3,665,111 A | 5/1972 | Schieser |
| 4,080,517 A | 3/1978 | Moricca et al. |
| 4,996,707 A | 2/1991 | O'Malley et al. |
| 4,996,760 A | 3/1991 | Coleman |
| 5,345,557 A | 9/1994 | Wendt |
| 5,680,478 A * | 10/1997 | Wang et al. .................. 382/176 |
| 5,836,664 A * | 11/1998 | Conner et al. ................. 353/70 |
| 6,052,663 A | 4/2000 | Kurzweil et al. |
| 6,076,060 A | 6/2000 | Lin et al. |
| 6,097,375 A | 8/2000 | Byford |
| 6,205,261 B1 * | 3/2001 | Goldberg ..................... 382/187 |
| 6,208,436 B1 * | 3/2001 | Cunningham ............... 358/474 |
| 6,256,610 B1 * | 7/2001 | Baum ......................... 704/260 |
| 6,377,928 B1 | 4/2002 | Saxena et al. |
| 6,408,072 B1 | 6/2002 | Fernandez-Martinez |
| 6,476,376 B1 | 11/2002 | Biegelsen et al. |
| 6,529,641 B1 * | 3/2003 | Chakraborty ............... 382/296 |
| 6,622,276 B2 | 9/2003 | Nagasaki et al. |
| 6,721,465 B1 * | 4/2004 | Nakashima et al. ......... 382/318 |
| 6,775,381 B1 | 8/2004 | Nelson et al. |
| 6,965,862 B2 * | 11/2005 | Schuller ..................... 704/258 |
| 7,031,553 B2 * | 4/2006 | Myers et al. ................ 382/289 |

(Continued)

FOREIGN PATENT DOCUMENTS

CA     2306527     10/2000

(Continued)

OTHER PUBLICATIONS

Kochi et al., "User-defined template for identifying document type and extractinginformation from documents", Proceedings of the Fifth International Conference onDocument Analysis and Recognition, ICDAR '99, pp. 127-130, Sep. 20-22, 1999.*

*Primary Examiner*—Brian L Albertalli
(74) *Attorney, Agent, or Firm*—Chernoff, Vilhauer, McClung & Stenzel

(57) ABSTRACT

A system for the automated conversion to audio of text displayed on a surface.

7 Claims, 6 Drawing Sheets

U.S. PATENT DOCUMENTS

| | | | |
|---|---|---|---|
| 7,088,853 B2 * | 8/2006 | Hiroe et al. | 382/153 |
| 7,092,496 B1 * | 8/2006 | Maes et al. | 379/88.01 |
| 7,171,046 B2 * | 1/2007 | Myers et al. | 382/187 |
| 2001/0044724 A1 | 11/2001 | Hon et al. | |
| 2001/0051872 A1 | 12/2001 | Kagoshima et al. | |
| 2001/0056342 A1 * | 12/2001 | Piehn et al. | 704/3 |
| 2002/0031264 A1 * | 3/2002 | Fujimoto et al. | 382/199 |
| 2002/0032702 A1 | 3/2002 | Horii | |
| 2002/0069062 A1 | 6/2002 | Hyde-Thomson et al. | |
| 2002/0163653 A1 * | 11/2002 | Struble et al. | 358/1.2 |
| 2003/0091174 A1 | 5/2003 | Fulford et al. | |
| 2003/0134256 A1 * | 7/2003 | Tretiakoff et al. | 434/112 |
| 2003/0229497 A1 * | 12/2003 | Wilson et al. | 704/270.1 |
| 2004/0203817 A1 * | 10/2004 | Pao et al. | 455/452.1 |

FOREIGN PATENT DOCUMENTS

| | | |
|---|---|---|
| CA | 2 343 664 | 4/2001 |
| DE | 100 62 379 A1 | 12/2000 |
| EP | 0457830 B1 | 1/1990 |
| EP | 0458859 B1 | 2/1990 |
| EP | 0680652 B1 | 1/1994 |
| EP | 0680654 B1 | 1/1994 |
| EP | 0689706 B1 | 1/1994 |
| EP | 1157526 | 11/2001 |
| JP | 2002-202789 | 7/2002 |
| KR | 9703093 | 3/1997 |
| KR | 2000024318 | 5/2000 |
| KR | 2000026424 | 5/2000 |
| KR | 259777 | 6/2000 |
| SG | 86445 | 2/2002 |
| WO | WO 85/04747 | 12/1984 |
| WO | WO 90/09716 | 1/1990 |
| WO | WO 90/09657 | 2/1990 |
| WO | WO 94/17516 | 1/1994 |
| WO | WO 94/17517 | 1/1994 |
| WO | WO 94/17518 | 1/1994 |
| WO | WO 94/23423 | 3/1994 |
| WO | WO 95/04988 | 8/1994 |
| WO | WO 96/22594 | 12/1995 |
| WO | WO 97/07499 | 8/1996 |
| WO | WO 97/34292 | 2/1997 |
| WO | WO 98/19297 | 10/1997 |
| WO | WO 99/43141 | 2/1999 |
| WO | WO 99/65256 | 6/1999 |
| WO | WO 99/66496 | 6/1999 |
| WO | WO 00/08832 | 7/1999 |
| WO | WO 00/10101 | 8/1999 |
| WO | WO 00/19412 | 9/1999 |
| WO | WO 00/23985 | 10/1999 |
| WO | WO 00/45373 | 1/2000 |
| WO | WO 00/51316 | 2/2000 |
| WO | WO 01/06489 A1 | 4/2000 |
| WO | WO 01/04799 A1 | 7/2000 |
| WO | WO 01/59976 A2 | 2/2001 |
| WO | WO 01/59976 A3 | 2/2001 |
| WO | WO 01/69905 A1 | 3/2001 |
| WO | WO 01/86634 A1 | 4/2001 |
| WO | WO 02/49003 A1 | 12/2001 |
| WO | WO 02/77972 A1 | 3/2002 |
| WO | WO 02/77975 A1 | 3/2002 |
| WO | WO 02/80107 A1 | 3/2002 |
| WO | WO 02/80140 A1 | 3/2002 |
| WO | WO 02/84643 A1 | 3/2002 |

* cited by examiner

TEXT TO SPEECH CONVERSION SYSTEM

BACKGROUND OF THE INVENTION

The present invention relates to a system for the automated conversion of displayed text to audio.

A vast amount of information is available in "hardcopy" print media such as books, newspapers, leaflets, and mailings as well as electronic print media such as online documents. Many people, however, are unable to avail themselves of this information due to visual impairment or illiteracy.

There are a variety of techniques employed to audibly convey the content of print media to those who can not read it. For example, print media may be recorded onto tapes which may then be made available for audio replay. However, this is highly inefficient and has found only a limited use with respect to popular novels and certain educational materials.

One existing system is capable of capturing an image of print media using a scanner or fax machine, recognizing the printed words from the image, and reciting each word in the order printed by relying upon phonemes. In this system, the optical character recognition software requires that the text portion of the image be orthogonally oriented with respect to the boundaries of the image. In other words, if the text is diagonally skewed on the print media, the software in this system will not be capable of interpreting the text. Accordingly, to ensure that the text portion of an image is properly oriented, this system physically aligns the print media in an orthogonal orientation using a tray, a frame, or other structure. The system then linearly scans the print media while it is physically maintained in its proper orientation by scanning successive rows of pixels into memory. The data, as a result of the scanning, is arranged in a digital image format and the system then processes the digital image, identifies the printed letters, and forms words from the letters to match each word to an associated audio file of that word, and plays the audio files in the proper sequence.

Unfortunately, using such a system is cumbersome. First, and particularly with respect to users of desktop flatbed scanners, a visually impaired person may have difficulty properly aligning the print media with respect to the scanning surface. Second, desktop flatbed scanners and fax machines are often too bulky and/or heavy to be used in a variety of social contexts, such as for a menu in a restaurant or for a magazine in a waiting room lobby. Finally, such a systems requires that print media be fed into the device page by page, which is not practical with respect to many items such as menus, bound books, or magazines.

DETAILED DESCRIPTION OF THE PREFERRED EMBODIMENT

Figure 1:
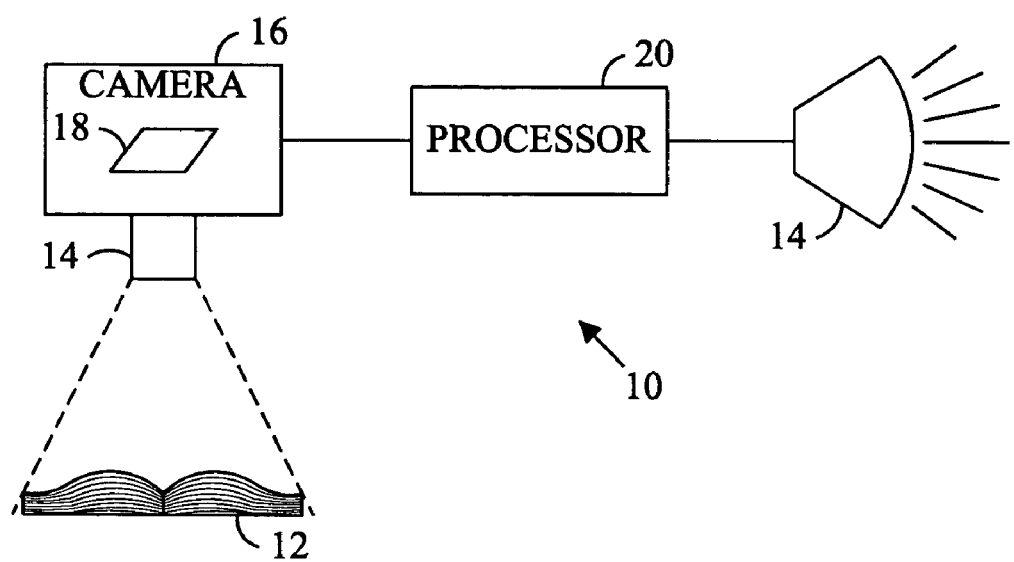
FIG. 1 is a schematic of an exemplary system for converting text to audio.

The present inventors considered the existing scanning technology and determined that the need to maintain the paper and imaging device in a precise orientation with respect to each other while obtaining the image is burdensome and ineffective. Further, the existing scanning devices are bulky and difficult to use in many situations, such as at a restaurant or at a bookstore. FIG. 1 illustrates an exemplary embodiment of a system 10 for converting text imprinted on media, such as a book 12, to an audio output from an audio device 14. It is to be understood that any other media may likewise be used. The lens 14 of a camera 16, suitable to be held in the hand of a user, is focused on the book 12. The lens 14 of the camera 16 focuses an image of the book 12 onto a light sensitive device 18, such as a CCD. The light sensitive device 18 together with associated electronic circuitry constructs an electronic representation of all or a portion of the book 12. The sensors of the device 18 are spatially arranged to capture an image. The image acquisition by the device 18 and image construction, unlike existing scanning based capture systems, typically senses the image in a simultaneous manner. In this manner, the image acquisition for subsequent character recognition is significantly faster and permits more effective subsequent processing, rather than waiting a significant period of time for the scanning operation of a scanner to complete. It is to be understood that other suitable image acquisition devices may likewise be used.

The camera 16 is interconnected to a processing device 20, such as a device that includes a microprocessor, to process the data received from the camera 16. The image may contain a portion of the book 12, one page of the book 12, or the book 12 overlaid on the surrounding background. The processing device 20 processes the image in a suitable manner, to be described in detail below, and provides an audio output to the audio device 14. The lens 14 and the camera 16 may be provided as a single unit, if desired, and interconnected to the processing device 20 by a suitable mechanism, such as a USB connection. The processing device 20 includes the audio device 14 or otherwise is connected to the audio device 14. The system may likewise be provided in a single unit.

Figure 2:
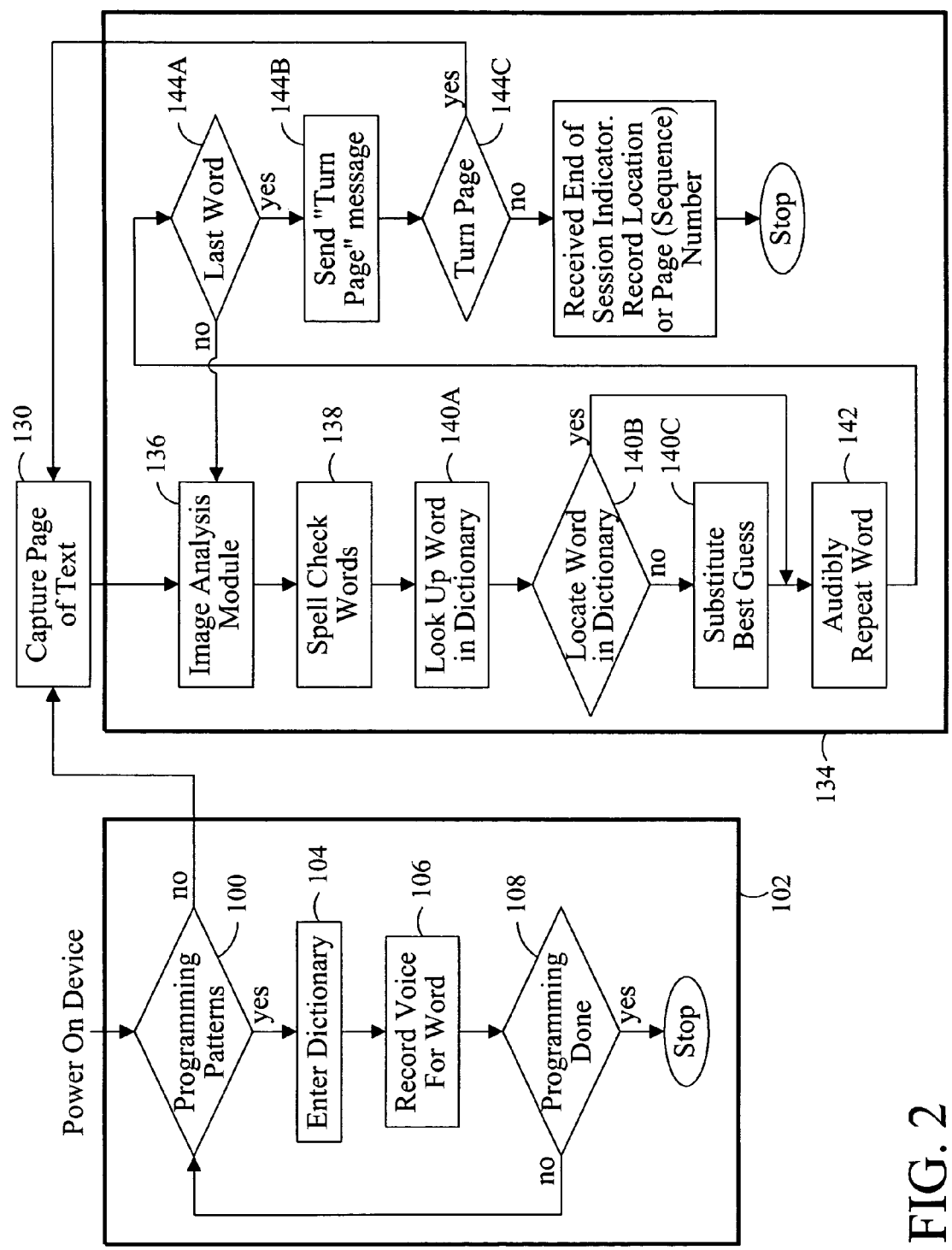
FIG. 2 is an exemplary flowchart representation of the system of FIG. 1.

Referring to FIG. 2, the system 10 upon being powered up or otherwise presenting a suitable selection, may present the user with an option 100 to program an electronic audio dictionary 102. If the option to program the dictionary 102 is selected, the text of the words desired to be recognized by the dictionary 102 may be entered at step 104. Then the system 10 may associate an audio file (e.g., audible version of the text such as "dog" for D O G) spoken by the user at step 106 with the text. In addition, the system 10 may provide a voice action for text or words (audible/textual) in the dictionary. Further, the system 10 may include phonics software that attempts to automatically create an audio file associated with the text, and audibly provides the audio file to the user for verification. Such phonics software may identify several possible pronunciations of the input word and repeat each of these to the user, who may select the desired alternative. Alternatively, more sophisticated software may be employed to choose the correct pronunciation from the context surrounding the word. The user may also be provided the option to reject all the associated audio files created by the system and alternatively vocally record the audio file to be associated with that text. Alternatively, the system may not attempt to phonetically predict the pronunciation of the text and simply rely on the user to select or input the correct audio file. The system 10 preferably includes a prerecorded dictionary comprising audio files and associated text. The programmable dictionary may permit the user to enter the words and audio files one at a time or as a series of words and audio files. An option 108 may be provided to permit the user to enter more words or otherwise end programming the device.

If the user does not elect to update the electronic dictionary, the system 10 then proceeds to an image capture step 130. At step 130 the user may orient the camera 16 to obtain an image of the source, which preferably includes some textual information. The camera 16 may capture the image through operation of any appropriate electrical, mechanical, or electromechanical operation such as a button, lever, computer keystroke, touchpad, voice, etc., depending on the particular device that is used. The image may be captured at any desired resolution, as text may be characterized at relatively low resolutions.

As it may be observed, the camera 16 obtains the image with a generally arbitrary orientation of the book 12. As a result of the camera being at an arbitrary angular orientation with respect to the source material, the resulting image will frequently not have the source material in a perpendicular orientation to the image sensor, such as with fixed scanning type devices. Accordingly, particularized processing of the image should be undertaken to orient the source material in an orientation suitable for optical character recognition. Once the image is captured, it may be processed by a processing unit 134. The processing unit 134 may include an image analysis module 136. The image analysis module 136 modifies the captured images in a suitable manner.

Figure 3:
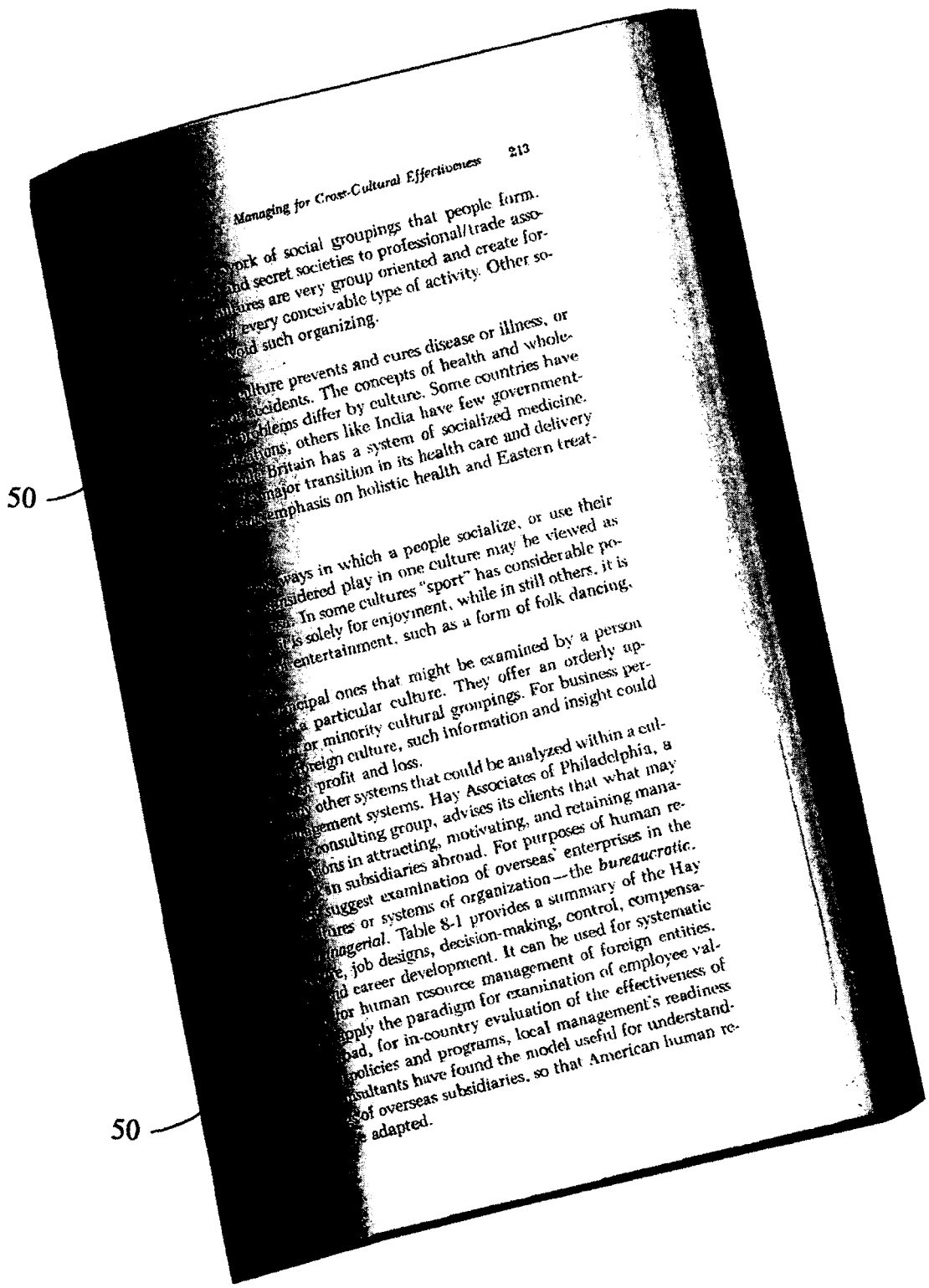
FIG. 3 is a schematic illustrating the manner in which text in an image of print media may be skewed or distorted.

FIG. 3 illustrates an example of text that may be obtained by the camera 16. The image, as it may be observed, exhibits both image skew, i.e. the global rotation of the text that results from the orientation of the text at the time of image capture, and warping distortions 50 that might result from a non-planar source. The non-planar source may be, for example, a thick book where the central region of the book is arched. The skewing and warping of the image may impede character recognition, and therefore the image analysis module 136 should modify the image to account for these effects.

Figure 4:
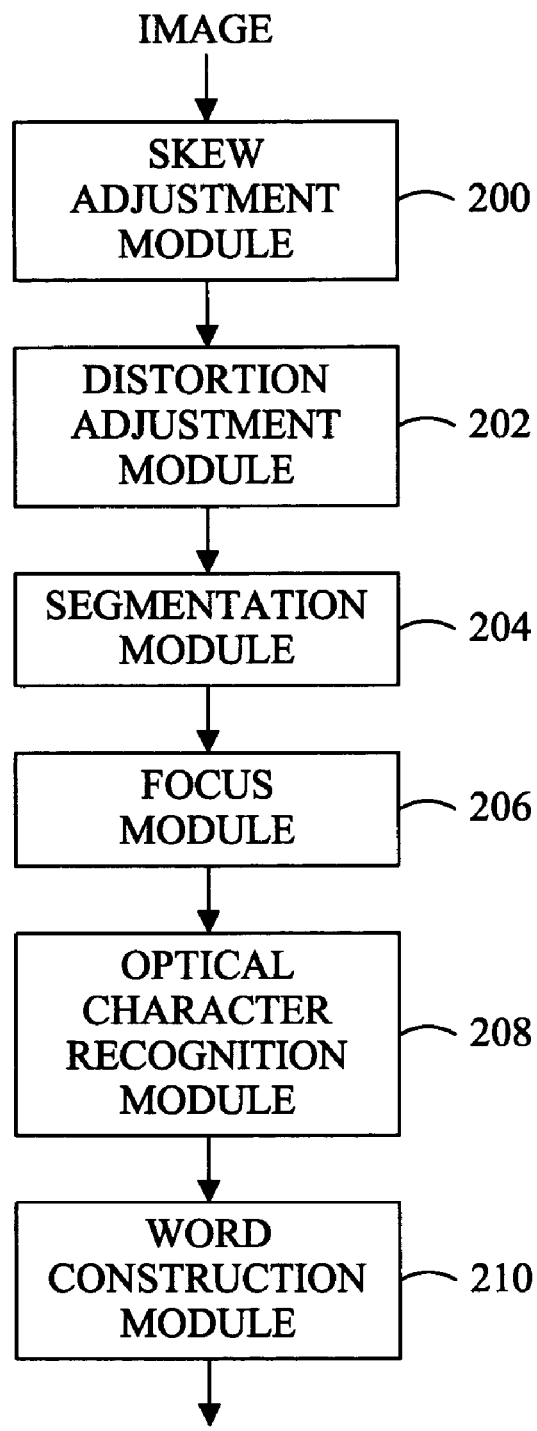
FIG. 4 is a flowchart representation of a portion of the system of FIG. 1.

Referring to FIG. 4, the image analysis module 136 may process the captured image by globally rotating the image using a skew adjustment module 200 so that the boundaries of the textual region of the scanned image is aligned in a desired manner with respect to the obtained image. For example, the boundaries of a rectangular page may be identified and substantially aligned in an orthogonal orientation. A variety of techniques may be used to modify the skew. One such technique includes converting the image to a grayscale, and then applying an edge detection filter to the image. Another technique may include using grayscale amplitude values, where a high grey scale pixel is replaced (i.e. dark text) with a 1 and a pixel with a low grayscale value (i.e. light background) with a 0, effectively detecting textual regions. Once the textual regions are identified, the skew may be modified by rotating the image.

The image analysis module 136 may also include a distortion adjustment module 202 that corrects for distortion in the lines of the text. Such distortion might arise, for example, from an image of pages of a book that has a large bulge to it, or taking an image of text that angles away from the lens 14, thus distorting the edges of the text in a manner similar to keystoning. The manner of correcting such distortion is similar to that of correcting the skew of the image, except that smaller portions of the text are examined and processed individually. The manner of correcting such keystone effects modifies the imprinted region of the image into a rectangular shape.

The image may be processed by a segmentation module 204 to segment the image into text and graphics (e.g. non-text). Once the text has been identified in the image, the text portion of the image may be further analyzed. Any suitable segmentation technique may be used.

After segmentation, the image analysis module 136 may include a focus module 206 that estimates the amount of blur in the image and then corrects for it. Any suitable blur estimation and correction technique may be used. The system 10 may estimate and correct the blur electronically, or alternately, the system 10 may include an auto-focusing lens 14 to correct blur prior to the capture of the image. The image processing steps may, of course, be performed in any suitable order. Also, fewer or additional imaging processing steps may be included, as desired.

Once the image has been processed to reduce blur, skew, and distortion, and all non-text portions of the image are segmented out of the image, the image may be processed by an optical character recognition (OCR) module 208. The purpose of the OCR module 208 is to recognize characters of text. Preferably, characters in a variety of fonts may be recognized. Once the characters are recognized, they are divided into words by a word construction module 210. OCR techniques and word construction techniques are well known.

Once individual words of text are distinguished by the image analysis module 136, a data stream of words is provided to a spell check module 138 which may correct spelling on a word-by-word basis, in the same manner as word processors, i.e. common misspelling such as "teh" is automatically corrected to "the." The spell check module 138 may also be optionally programmable.

The corrected data stream of words may be forwarded to a word location module 140A-140C that attempts to compare the words in the data stream to those in the electronic dictionary. If a dictionary word can not be found, the word location module may select a "guess" by selecting from a series of words in the electronic dictionary similar to the word in the data stream or "guessing" the proper output. Alternatively, the word "unknown" could represent any word in the data stream that is unable to be located in the electronic dictionary. Optionally, the system 10 may store a list of unknown words during use for later display to a partially blind user so that a user may elect to add selected unknown words to the programmable dictionary as convenient.

Because the text, hence the book 12 or other printed material, may be placed at an arbitrary orientation with respect to the camera 16, the system 10 does not require a tray, a feeder, or other bulky frame. Thus, the camera 16 may be compact and contained in any number of portable devices, such as digital cameras, cell phones, PDAs, laptop computers, etc. The system 10 may therefore be used in far more situations than existing text-to audio systems. Further, because the print media being captured does not need to be fed into an optical device page by page, a far wider range of print media is available for audio conversion using the system 10 than is presently available. For example, if the system 10 is incorporated into a cell phone or a PDA, a visually impaired person could capture an image of a menu, a newspaper, a flyer received on a street, even print displayed on an LED or LCD display. Each of these items could then be audibly read to the user by the system 10.

Figure 5:
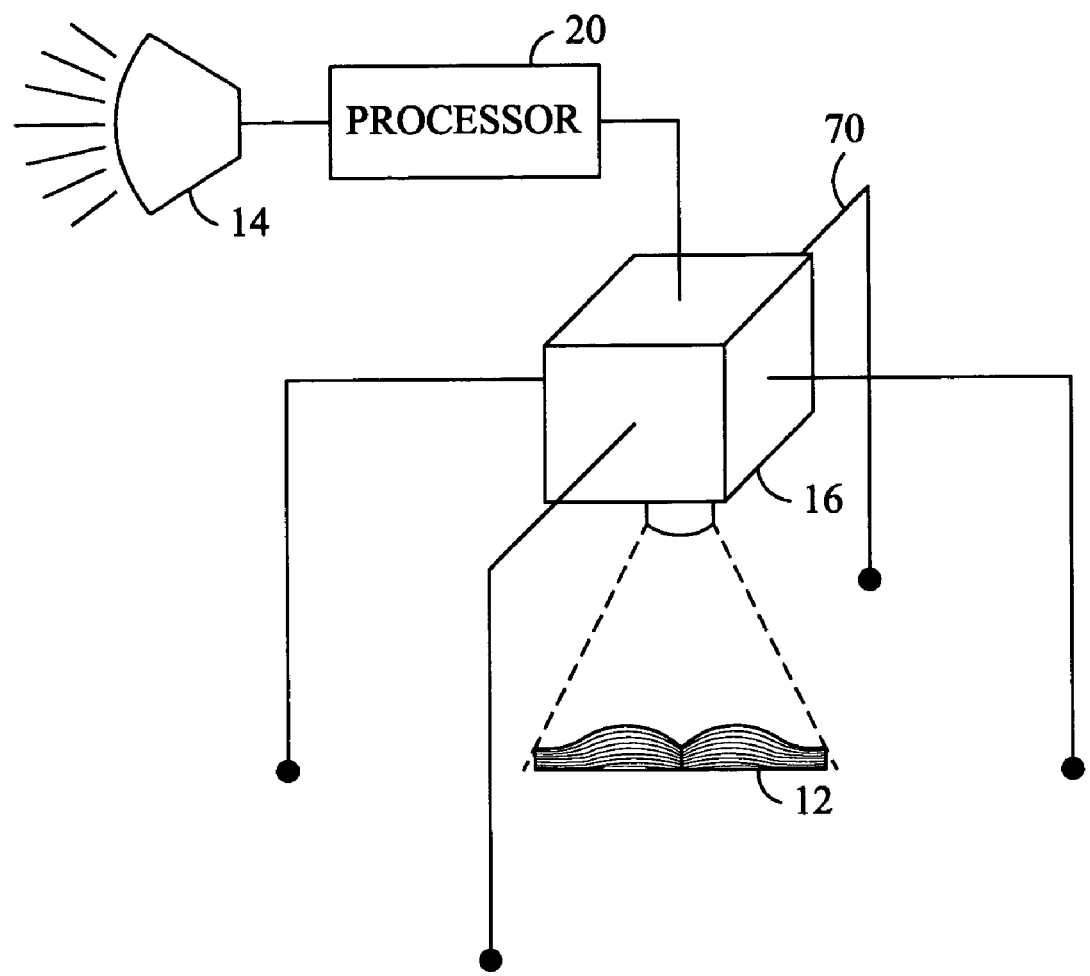
FIG. 5 illustrates a camera support structure.

Referring to FIG. 5, the system 10 may be incorporated into a "desktop" unit comprising a downwardly directed camera 16 connected to the processor 20 and the audio device 18. In such a configuration, the camera 16 may be supported on a frame 70 above the book 12, and have a zoom feature along with operating software to automatically scale in and focus on print media placed beneath the lens. Preferably, any device incorporating the system 10 would have a self-contained power source such as a battery. The visually impaired may find it difficult to "focus" the lens onto the media. A small, portable and rigid fixture may be used to both hold the camera at the correct height, allow the fixture to hold down the media, and clamp the media at the margins of the media. The clamping at the margins will orient the page and minimize skew.

Once the words in the data stream are identified, each successive word is sent, in sequence to a word recitation module 142 that instructs the audio device 14 to play the audio files associated with each successive word. Some embodiments of the system 10 may permit a user to select one of a selection of voices, or adjust the volume or pitch of the audio device. Another embodiment of the system 10 may permit a user to delay playback, and store one or more audio streams into memory or a buffer until a convenient time arises to listen to the audio stream. If this embodiment is employed, it would be preferable to erase an electronic image file from memory once the associated word data stream is stored, as the electronic image is no longer necessary and uses far more storage space than the word data stream, which could merely comprise a list of addresses in an electronic dictionary. Once the audio for an image has been played, or stored if desired, the user may be prompted by a page prompt module 144A-144C to turn the page or otherwise notified that the image has been processed.

The system 10 may be able to recognize a page number based on its position in the header or footer of the image. After being prompted to turn the page, if a user turns to a non-sequential page, i.e. skips a page or inadvertently turns the book back a page instead of forward, the system 10 could audibly recite a message that a page has been skipped or the book paged backwards, etc and prompt the user to verify that that was intended or allow a user to turn to the correct page.

Figure 6:
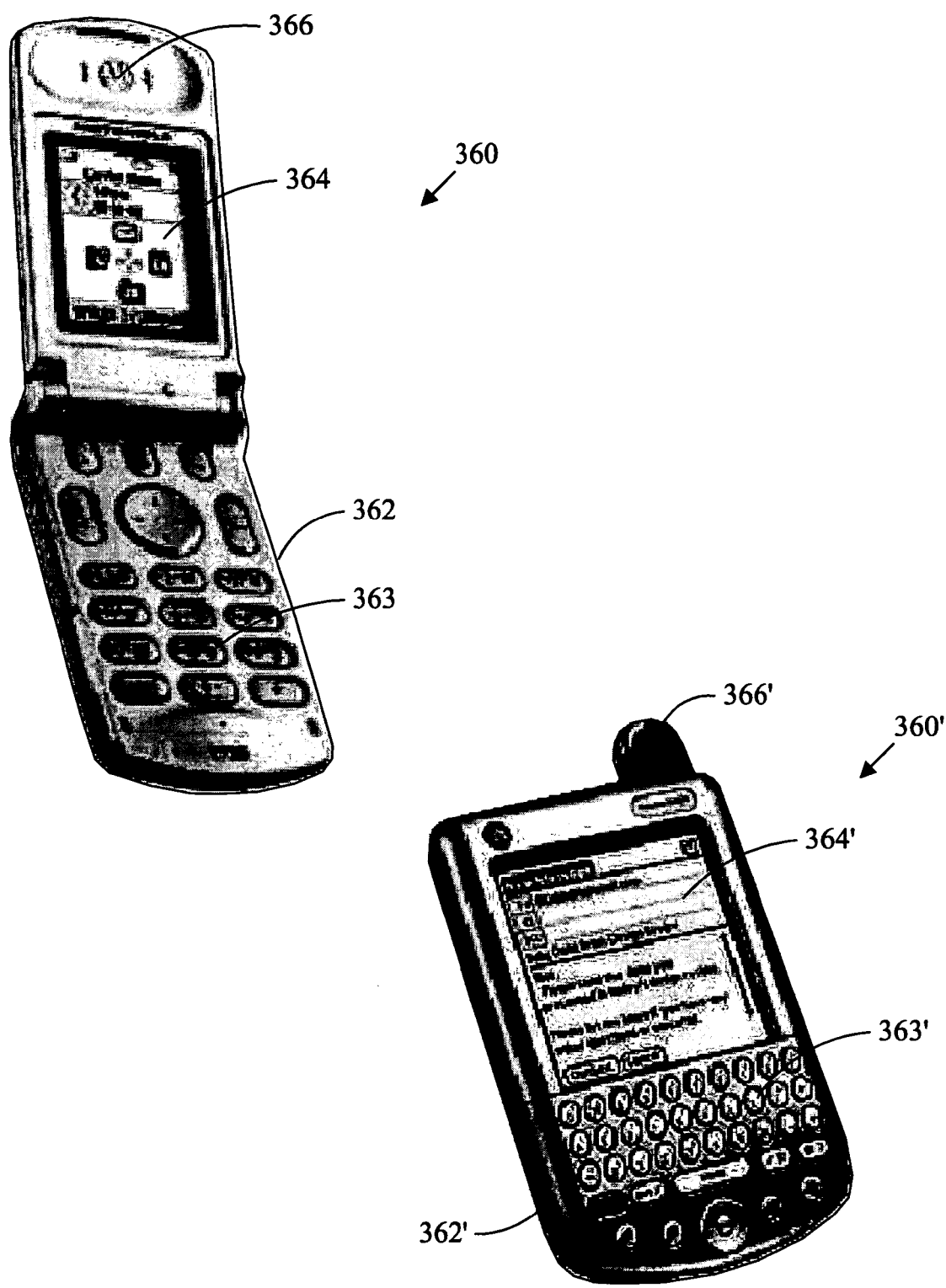
FIG. 6 is a figure of an exemplary cell phone or PDA that incorporates a text-to audio converter.

Because the image analysis module 136 is capable of correcting the blur, the skew, the distortion, and other imperfections in a captured image, an image of print media may be captured and converted into audio by portable devices. FIG. 6 shows a cell phones 360 that includes a text-to audio converter such as the system 10. FIG. 6 also illustrates a PDA that has similar features having the items signified by a "'". The cell phone 360 includes a dialing portion 362 with keypad 363 and a display portion 364. A digital camera 366 may be mounted in the cell phone 360 at any appropriate location such as the top of the display portion 364. Alternatively, the camera 366 could be located at the top, outward edge surface of the dialing portion 362. The camera 366 preferably includes a lens and an imaging array. The lens may also include a zoom feature. The array is preferably electrically connected to the display portion 364 so that the image projected by the lens onto the array is shown on the display. The keypad 363 preferably includes a button to digitally capture the image projected by the lens onto the array. The cell phone 360 preferably includes an internal microprocessor to process the image into a word data stream and a word recitation module, that is coupled to an audio device to audibly recite the words detected.

The cell phone 360 may be easily carried by a person and used to capture a wide variety of print media, including restaurant menus, newspapers, magazine pages, text on billboards, pages of books in libraries, screen shots on computer monitors, LCD and LED displays, nutritional labels in grocery stores, among many other examples. The utility of such a device is apparent. Because the types of text now available for audible recitation with the cell phone 360 (or any other portable device that includes the system 10 such as a PDA, a laptop computer, etc.) is so varied, the cell phone 360 or other device may preferably include software that implements a plurality of "templates" to distinguish among the types of print media that may potentially be captured and audibly recited.

To illustrate the utility of this optional feature, assume that a visually impaired person is seated in a restaurant and handed a menu. Some menus are printed in dual column format with the entree selections printed in the left hand column and the price for each respective entree printed in the right hand column, across from the respective entree to which the price pertains. Other menus, however, are printed in single column format with the price of an entree simply written at the end of the text of the entree to which it pertains. Still other menus may separate entrees by price, i.e. list a price and then list all the entrees available for that price. In this scenario, the cell phone 360 may include a programmed series of templates, one of which is a "menu" template, which the user could then select, i.e. the user could press a button on a cell phone to cycle through audibly recited templates until the "menu" template is recited by the audio device. With that template, the image processing module would recognize that a captured image is from a menu, and on the basis of that template, analyze the image to determine which format the menu has been printed in, and recite the text in the proper sequence.

Other types of templates may also be used. For example, the cell phone 360 or other such device could include templates for newspapers, or phone books. If a phone book template used with the cell phone 360, the phone book template could not only identify the column format of the text, but when using that template, a user could be allowed an option of one-touch dialing of the number or name just audibly recited.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A cell phone comprising:
   (a) a body portion containing a keypad, an audio receiver, and an audio transmitter;
   (b) a digital camera in said body portion having an outwardly facing lens;
   (c) a processor capable of receiving an image containing a text sequence from said digital camera, distinguishing individual words in said sequence, and causing said audio transmitter to recite said individual words in said sequence; and
   (d) storage storing a plurality of templates organized into predefined categories, each of said categories associated with a unique audible signal recitable from said audio transmitter, and at least one of said categories including more than one template, where said processor identifies a selected one of said predefined categories based upon a manual input received after audible recitation of a said signal associated with the selected one of said predefined categories, and automatically identifies the layout format of text in an image captured by said digital camera based upon solely those ones of said plurality of templates within said identified predefined category.

2. The cell phone of claim 1 where at least one of said templates is in the layout format of a menu.

3. The cell phone of claim 1 where said processor is capable of correcting for at least one of a skew, blur, and distortion.

4. The cell phone of claim 1 where said processor includes a page prompt module that is capable of identifying a page number in the header or footer of an image, and prompting the audio device to recite a warning to a user if the apparatus receives images of pages of text in nonsequential order.

5. The cell phone of claim 1 where at least one of said templates is in the layout format of a newspaper.

6. The cell phone of claim 1 where one of said templates corresponds to a phone book.

7. The cell phone of claim 6 where said cell phone includes a button and said one of said templates instructs said processor to dial the phone number of a phone book entry being recited when the user presses said button.

* * * * *